Patented Nov. 20, 1945

2,389,302

UNITED STATES PATENT OFFICE 2,389,302

TREATMENT OF INSECT-DAMAGED WHEAT

Cyril Harry Evans, Cleethorpes, England, assignor to Spillers Limited, London, England, a British joint-stock corporation No Drawing. Application September 29, 1942, Serial No. 460,172. In Great Britain September 26, 1941

6 Claims. (Cl. 99—91)

Wheat, particularly European wheat, is liable during growth to the attack of insects usually known as "wheat bugs." These insects belong to the species *Hemiptera* and are of the genera Aelia and Eurygaster. Two common insects are Eurygaster maurus and Aelia acuminata. Wheat attacked in the early stages of growth has no milling value as the grain does not mature but it is not dangerous as the various cleaning operations through which wheat passes before milling suffice to remove the shivelled grain. Grain attacked when approaching maturity however presents a very difficult problem for the miller since it cannot be removed from the bulk in the wheat cleaning operations, and apart from restricting its use to small percentages in the grist (which method is not applicable in countries where much sound grain is not available), there has hitherto been no simple method of treating wheat to overcome the objectionable effects of this insect pest. Grain attacked is difficult to detect by visual examination as the puncture made by the insect is small, and the presence of a few damaged grains in a large quantity of sound grain is likely to make the flour milled from it unfit for baking. This is because the insect is apparently unable to assimilate the endosperm of the wheat and therefore after making a hole through the bran layers injects saliva which contains enzymes. These attack the proteins (and possibly also the starch of the wheat) and convert them into a form assimilable by the insect. While the amount of the grain actually eaten by the insect is negligible, the enzymes which are left in the grain are particularly active and serve to make not only the unattacked parts of the infected grains useless for conversion into flour for baking, but affect as much as twenty times the amount of sound grain if this grain is milled with it.

Flour milled from infected wheat is subject to intense enzymic activity during panary fermentation with the result that the dough "runs" and produces bread of very poor quality.

It has been proposed to treat "bug wheat" by heating, but the method involves special apparatus and unless great care is taken in the application of heat the grain is apt to be rendered useless for baking purposes.

The present invention is based upon my discovery that if sodium chlorite is added to the insect damaged flour the effects may be overcome and good baking quality is restored to the flour. I am aware that it has been previously proposed to use sodium chlorite for the general "improvement and maturing" of flour, but many more effective and convenient remedies are available for this purpose, and the proportions of sodium chlorite used for treatment of such damaged flour are greater than could be used for general "improvement and maturing," and such proportions would have markedly adverse effects on the baking quality of flour milled from sound wheats.

In the practical application of the invention the addition of sodium chlorite may be made either to the grain before milling or to the flour by spraying or other application of a water solution of sodium chlorite as is preferred. Dry sodium chlorite in the condition of powder may alternatively be mixed with flour.

Generally the "wheat bug" puncture is such that the harmful secretion lies close under the bran layer. For this reason it is possible to apply the treatment with advantage by immersion of the damaged grain in a solution of sodium chlorite or otherwise to apply the solution over or upon the grain as by spraying. The application of the solution upon the grain has the advantage that it is possible to treat the affected wheat only or the wheat containing the affected grains, instead of adding the sodium chlorite to the flour obtained by milling several varieties of wheat including perhaps only a portion of wheat likely to have been affected.

The presence of sodium chlorite in the bran is not detrimental as it quickly becomes reduced to sodium chloride which is quite innocuous.

The proportions of sodium chlorite to be added depend of course on the extent to which the wheat is damaged. The effect of sodium chlorite on sound flour is to tighten and shorten the dough, and when left in contact with the flour for some time it operates as a bleaching agent. Proportions of the order of ½ to 1 gram per sack (280 lbs.), as is known, improve sound flour. Larger amounts cause cracking of the dough skin and the bread produced is deficient in volume, and has a very rough crust. Thus as a remedy for "wheat bug" damage proportions of sodium chlorite are added beyond those necessary or desirable for sound flour, whereby the tightening action of the sodium chlorite offsets the tendency of the damaged flour to run, and become sticky in the dough. Thus for example with wheat from Roumania containing "wheat bug" damaged grain amounting approximately to 5% of the whole, the treatment by spraying with a solution containing 2 grams per sack of sodium chlorite proved very effective and the flour baked into a good loaf. Without treatment it was hardly possible to obtain bread by the use of the flour produced from this wheat.

I claim:

1. A process for counteracting the harmful effects of the presence in wheat of grain damaged by *Hemiptera* of the genera Aelia and Eurygaster, consisting in adding to the wheat in a condition selected from the granular and milled conditions of the wheat an amount of sodium chlorite exceeding 1 gram per sack of 280 lbs.

2. A process according to claim 1, wherein the sodium chlorite is added dry and as powder.

3. A process according to claim 1, wherein the sodium chlorite is added as a solution in water.

4. A process according to claim 1, wherein a solution in water of sodium chlorite is sprayed upon the material under treatment.

5. A process according to claim 1, wherein the wheat to be treated is immersed in a solution of sodium chlorite.

6. A process in accordance with claim 1 in which sodium chlorite is added to each 280 pound sack at the rate of approximately 2 grams for a content of infected material of five percent.

CYRIL HARRY EVANS.